April 15, 1969 D. MITCHELL 3,439,121
MULTIPLE CHANNEL LOUD-SPEAKING TELEPHONE
Filed Sept. 30, 1965
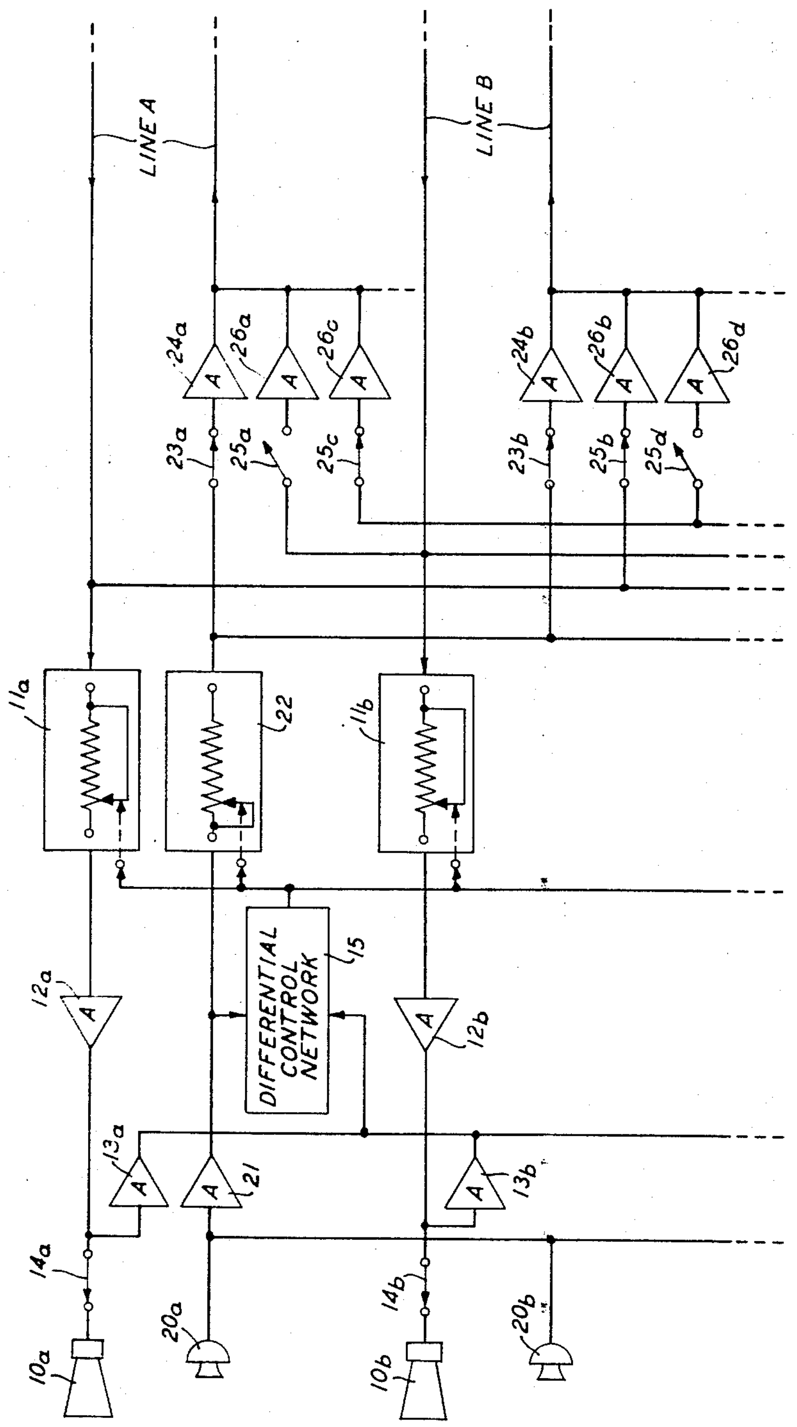
INVENTOR
D. MITCHELL
BY C. E. Hirsch
ATTORNEY

United States Patent Office 3,439,121

Patented Apr. 15, 1969

3,439,121

MULTIPLE CHANNEL LOUD-SPEAKING TELEPHONE

Doren Mitchell, Martinsville, N.J., assignor to Bell Telephone Laboratories, Incorporated, New York, N.Y., a corporation of New York Filed Sept. 30, 1965, Ser. No. 491,619

Int. Cl. H04m *1/00*

U.S. Cl. 179—1 7 Claims

ABSTRACT OF THE DISCLOSURE

The normal use of several loud-speaking telephone circuits at one location permits the local subscriber to converse with each of several distant subscribers, but makes it difficult for the distant subscribers to converse with one another; only acoustic coupling is available. In accordance with this invention, distant subscribers to such a conference are interconnected. Each loudspeaker at the conference location responds to one selected distant subscriber only, but conference microphones are connected to selected different distant subscribers. By utilizing only one loudspeaker per channel, the conference location subscriber may keep the distant conversants separate and identify them in accordance with the placement of the associate loudspeaker in the room. Provision is made for selectively "cutting-out" one or more interconnections and for avoiding singing.

This invention pertains to loud-speaking telephone arrangements, and more particularly, to arrangements for permitting a number of loud-speaking telephones to be used simultaneously and yet effectively at the single location.

The loud-speaking telephone provides a convenient way of carrying on associated activities, such as the turning of pages of reference material, referring to drawings, and the like, while carrying on a telephine conversation. The user talks into a microphone and listens to an incoming signal developed by a loudspeaker conveniently located in his vicinity. By suitably interconnecting the microphone in the loudspeaker through the use of amplifiers and controlled gain circuits, echo, singing, and similar effects are reduced to a minimum. Sufficient gain is provided to permit the user to carry on a conversation even though he is a considerable distance from the microphone and loudspeaker instruments.

In some cases a user may find it desirable to employ two or more loudspeaking telephone instruments at the same location and, on occasion, to establish a conference connection between two or more distant stations. Under these circumstances, the local user may experience difficulty in separating speech received simultaneously from two or more distant talkers. If he favors one call over the other by moving closer to one set of instruments, the other distant user may have difficulty in hearing him. The difficulty is compounded when the local user attempts to carry on either or both conversations while at some distance form both microphones, or when interference is developed by projected speech from another loudspeaker in the room. Moreover, it is difficult for the distant users to enter into a multi-part conversation. The distant users, although perhaps aware of another distant user's utterances, generally can not readily understand them because of the acoustic power loss between the loudspeaker of one system and the microphone of another.

It is the principal object of the present invention to overcome these difficulties by establishing a high degree of spatial separation of incoming speech signals for the convenience of a local user, and a controlled degree of cross-coupling between the several incoming circuits for the convenience of distant users.

A user at a location equipped with a multiple unit telephone system of the present invention identifies incoming signals by the spatial placement of the signal within the room. He hears distant talkers from different loudspeakers and may associate each talker with a particular sound source. This allows the user, in effect, to "place" distant talkers in accordance with the apparent origin of their utterances in the room. The spatial separation effect is particularly pronounced on those occasions during which two or more distant users talk at once. The ability of a listener to distinguish between, and concentrate on, one or several signals originating independently in spatially separated loudspeakers has been demonstrated aptly in experiments in the field of stereophonic reproduction. An electrical mixing of two signals and reproduction by way of a common loudspeaker or by way of a number of loudspeakers connected in parallel, yields a mixture difficult to separate subjectively.

Other features of the present invention assure that each distant conferee will hear both the local user and other distant conferees at a satisfactory listening level. There need be no reliance on acoustic coupling. Undue side effects, such as ringing, sidetone and the like, are avoided by utilizing each incoming signal and each outgoing signal for controlling the balance between the signals in the incoming and the outgoing lines. Isolation between the several loudspeaker lines is maintained to preserve the spatial separation effect.

Provision is made in accordance with another feature of the invention for selectively removing momentarily any one or more distant conversants from the conference arrangement at the discretion of the local user. A distant listener may thus be prevented from hearing one or more distant talkers, the local talker, or all talkers.

These and other features of the invention will be better understood from a consideration of the following detailed description of a preferred embodiment thereof as illustrated in the accompanying block schematic diagram.

The single figure illustrates one station of a loudspeaking telephone conference system equipped, in accordance with the invention, for selective spatial separation and controlled cross-coupling. Two line pairs are indicated for connecting the station via the usual switched telephone network, for example, with two distant stations. A separate loudspeaker-microphone arrangement is employed for each line pair. Dashed lines associated with a number of the circuit connections indicate the principles illustrated in the figure may be applied to any number of additional circuits. Further, hybrid coils may be used to terminate each of the lines if desired so that more efficient line utilization may be achieved.

Incoming signals received on line A reach loudspeaker $\mathbf{10}_a$ by way of variolosser $\mathbf{11}_a$ and amplifier $\mathbf{12}_a$. Signals received on line B reach loudspeaker $\mathbf{10}_b$ by way of variolosser $\mathbf{11}_b$ and amplifier $\mathbf{12}_b$. Complete isolation of the two incoming signals is thus maintained. When two of the distant users talk simultaneously, a quasi-stereo effect is evident to the local user since he hears speech from line A only by way of loudspeaker $\mathbf{10}_a$ and speech from line B only by way of loudspeaker $\mathbf{10}_b$. He is able to concentrate on either one of the distant talkers to the exclusion of the other because of the spatial separation of loudspeakers $\mathbf{10}_a$ and $\mathbf{10}_b$. A somewhat less favorable condition occurs when a number of distant users talk simultaneously and one or a number of them has either a loudspeaking telephone arrangement or an echo suppressor in his line. In this case, some interference between the voice operated devices of the system may develop. However, the quasi-stereo effect for the local user still enables him to distinguish, to a degree, between the distant talkers.

Speech originating at the conference station is picked up by microphones $20_a$ and $20_b$, and indeed by all of the microphones $20_n$ in a multiple line system, which are spaced about the conference location. The resulting signals are delivered in parallel via ampilfier 21, variolosser 22, switches $23_a$ and $23_b$, and amplifiers $24_a$ and $24_b$, to outgoing lines A and B, respectively. Thus, all distant conferees receive identical signals from the conference station.

Echo and singing effects are prevented by actuating variolossers $11_a$, $11_b$ . . . $11_n$, and variolosser 22 in a complementary fashion in response to control signals from differential control network 15. Lossers 11 all vary in the same way in response to a control signal; losser 22 varies in the opposite direction in response to the same signal. In the quiescent state, the loss of each of devices 11 is essentially zero and the loss of device 22 is rather substantial, on the order of about 15 or 20 db.

When there is speech from a local talker, differential control network 15, supplied with the outgoing signals, delivers a control signal which removes loss from device 22 so that the outgoing signals reach the line with good volume. At the same time, the loss of unit 11 is increased in a complementary manner. Thus, there is always a loss in the singing path from any line through the loudspeakers and back into the microphones which is sufficient to prevent echoes or singing.

Incoming signals from any line, on the other hand, are supplied to differential control network 15 via amplifier $13_a$, $13_b$ . . . $13_n$ so that the control network produces a bias which prevents echo and reverberation in the room from actuating network 15 as outgoing signals. Incoming speech is thus normally free to pass through the particular loss device 11 in its path with that loss set at zero. This allows a satisfactory volume to be delivered into the room.

The situation is somewhat different during double talking. In this case, whichever speech signal is the greater tends to overpower the effect of the other speech signal on control network 15. Thus, if the local talker in the room is louder, his signals operate through control network 15 to reduce the loss of device 22 and to increase the loss of all of devices 11. On the other hand, if speech signals from a distant talker are the greater, they will overpower local speech signals and thus remove loss from devices 11 and increase the loss of device 22.

In order to preserve the sound localization effect, it is necessary to maintain signal isolation in coupling each incoming circuit to the differential control network. This is achieved by passing the incoming signals through isolation amplifiers $13_a$, $13_b$ . . . $13_n$, i.e., one-way devices or the like, before delivering them to network 15. As an alternative, appropriate isolation means may be inserted in each connecting path and a common amplifier used to overcome insertion loss.

In order that a distant user may hear the conversation of other distant users, signals received from each distant station are delivered selectively via switches 25 and amplifiers 26 to all other outgoing lines. For example, if the distant user on line A is talking, the signal received on line A is supplied by way of closed switch $25_b$ and amplifier $26_b$ to line B. The signal is also delivered, as desired, by way of corresponding switches $25_n$ and amplifiers $26_n$ (not shown) to lines N. In the event that the user at the conference station wishes to prevent any one of the distant users from hearing his, the local user's, speech, switches $23_a$, $23_b$ . . . $23_n$ are actuated in the selected outgoing circuits. If the local user desires the distant user on line A only to hear what he is saying, for example, switch $23_a$ is closed and switches $23_b$ . . . $23_n$ are opened. Similarly, if the local user wishes to prevent speech from any one of the distant conferees from reaching any other distant listener, corresponding switches are opened; for example, to prevent signals on line B from being heard by the user on line A, switch $25_a$ is opened. Various combinations of switching actions may be employed to employ speaking and listening combinations under control of the local user. Complete privacy between distant users may be assured by selectively activating switches $14_a$, $14_b$ . . . $14_n$ to disconnect the loudspeakers from the incoming lines thereby to interrupt the acoustic paths between loudspeakers and microphones. The local user, under this operating condition may continue the conversation by way of a conventional telephone receiver or the like.

If any one of the lines is terminated in a hybrid arrangement, some echo may be returned from the hybrid. For example, if a distant user talks on line A, that portion of his speech delivered to line B (via amplifier $26_b$) may be partially reflected by the hybrid and delivered through variolosser $11_b$ to loudspeaker $10_b$. However, the effect of this echo is not serious or significant since it is substantially lower in level than the direct transmission signals. By assuring that it is at least 15 db below other signals, using techniques well-known in the art, the echo signal has little or no effect on the sound placement feature of the arrangement.

It is evident that the several switches and the associated line amplifiers shown in the drawing may be combined in unitary gain-controlled units, i.e., an amplifier with its gain reduced to zero is equivalent to an open switch, and that multiple switching arrangements for actuating selected numbers of switches at a time may be employed as desired. Numerous other modifications and circuit arrangements may also be devised by those skilled in the art without however departing from the spirit and scope of the invention.

What is claimed is:

1. In a conference telephone terminal station arrangement equipped with a plurality of independent hands-free telephone instruments for use in coupling proximity to one another at a user location, means for directing incoming signals from each of a plurality of independent two-way telephone circuits to preselected receivers associated with said telephone instruments at said user location, means for concurrently directing outgoing signals originating in transmitters associated with said telephone instruments to preselected different ones of said telephone circuits, and means for selectively interconnecting said independent telephone circuits.

2. A hands-free conference telephone system for a user location, which comprises, individual hands-free receiver and transmitter instruments for each two-way telephone circuit terminating at said user location, said individual instruments being in acoustic coupling proximity to one another, means for supplying signals incoming on each of said circuits to one only of said receivers, means for concurrently supplying signals developed by each of said transmitters to all of said circuits, and means for selectively interconnecting said several two-way telephone circuits.

3. In a loud-speaking telephone system which includes a plurality of independent two-way telephone channels terminating at a user location, a loud-speaker circuit for incoming signals and a microphone circuit for outgoing signals associated with each channel and terminating for use together in a common acoustic environment, means for directing incoming signals from each channels to selected ones of the loudspeaker circuits at said user location and selectively to other channels outgoing from said location, means for directing signals from each microphone circuit at said user location to selected ones of said outgoing channels, and means responsive to the relative signal levels in each of said selected loudspeaker circuits and all of said microphone circuits for selectively adjusting the gains of said microphone and loudspeaker circuits.

4. A loud-speaking telephone system which includes a plurality of independent two-way telephone channels terminating for use in a common acoustic environment at a user location, comprising, in combination, a loudspeaker circuit for incoming signals and a microphone circuit for outgoing signals associated with each of said channels, means for controllably connecting incoming signals from each channel to one of said loudspeaker circuits, means for selectively connecting incoming signals from each channel to other channels outgoing from said location, means for controllably connecting signals from all microphone circuits at said user location to selected ones of said outgoing channels, and means responsive to the relative signal levels in each of said selected loadspeaker circuits and all of said microphone circuits together for selectively adjusting the gains of said microphone circuits and said loadspeaker circuits.

5. In a loud-speaking telephone system which includes a plurality of independent two-way telephone channels terminating at a user location, and a loudspeaker circuit for incoming signals and a microphone circuit for outgoing signals associated with each channel: first means for directing incoming signals from each channel to one of the loudspeaker circuits at said user location, said first means including a variolosser, an amplifier, and a switch connected in tandem; second means for selectively directing incoming signals from each channel to other channels outgoing from said location, said second means including an amplifier and a switch connected in tandem; third means for directing signals from each microphone circuit at said user location to selected ones of said outgoing channels, said third means including means for combining the signals from all of said microphone circuits, a variolosser for controlling the gain of said combined signals, and the tandem connection of a switch and an amplifier in each of said outgoing channels supplied with said gain-controlled combined signals; and fourth means responsive to the relative signal levels in each of said loudspeaker circuits and all of said microphone circuits for selectively adjusting the gains of said microphone and said loudspeaker circuits, said fourth means including a differential controlled network having first and second inputs and a control signal output, a plurality of amplifiers for coupling signals in each of said loudspeaker circuits to said first control network input, an amplifier for coupling said combined microphone signals to said second control network input; and fifth means for employing the differential control signal developed at the output of said control network for reciprocally adjusting said variolossers included in said first means and said variolosser included in said third means.

6. A telephone terminal arrangement which comprises, a plurality of independent two-way channels terminating at a telephone conference station, a loudspeaker circuit for signals incoming on each channel, a microphone circuit for signals outgoing on each channel, said loudspeaker circuits and said microphone circuits terminating for use in a common acoustic environment at said conference station, means for directing incoming signals from each channel to one only of the loudspeaker circuits at said conference station, thereby to establish a high degree of spatial separation of incoming signals, means for directing incoming signals selectively to other channels outgoing from said station, thereby to insure adequate listening levels at remote user locations, means for concurrently directing signals originating in said microphone circuit at said conference station to selected ones of said outgoing channels, and means for interrupting selected ones of said loudspeaker circuits thereby to prevent signals originating on one incoming channel from reaching another outgoing channel.

7. A network for interconnecting a plurality of independent loud-speaking telephone instruments coupled at the same user terminal to independent two-way telephone circuits, which comprises, in combination, a first plurality of gain-controlled systems for selectively supplying signals from each incoming telephone channel to the loudspeaker circuit of one of a number of loud-speaking telephone instruments placed in proximity to one another, a second plurality of gain-controlled systems for selectively supplying signals from each incoming telephone channel to other channels outgoing from said location, a third gain-controlled system for selectively supplying signals developed by the microphone circuits of each of said loud-speaking telephone instruments to selected ones of said outgoing channels, a differential network responsive to the relative signal levels in each of said telephone circuits supplied with incoming signals and to the relative level of signals in all of said microphone circuits together for developing a control signal, means for employing said control signal to adjust the gain of said first plurality of gain-controlled systems, and means for employing said control signal to adjust the gain of said third gain-controlled system in a fashion complementary to said adjustment of said first gain-controlled systems.

References Cited

UNITED STATES PATENTS

| | | |
|---|---|---|
| 2,102,903 | 12/1937 | Leveque. |
| 2,164,752 | 7/1939 | Nyquist. |
| 2,177,769 | 10/1939 | Erickson. |
| 2,247,507 | 7/1941 | Lanham et al. |
| 2,336,880 | 12/1943 | Mitchell. |
| 2,644,039 | 6/1953 | Rensch. |
| 2,720,556 | 10/1955 | Clark. |
| 2,871,291 | 1/1959 | Horner. |
| 3,144,517 | 8/1964 | Albrecht. |

KATHLEEN H. CLAFFY, *Primary Examiner.*

V. C. WILKS, *Assistant Examiner.*

U.S. Cl. X.R.

179—81